UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT-REMOVER.

1,027,466. Specification of Letters Patent. Patented May 28, 1912.

No Drawing. Application filed September 18, 1907. Serial No. 393,535.

*To all whom it may concern:*

Be it known that I, CARLETON ELLIS, a citizen of the United States, and a resident of Larchmont, in the county of Westchester and State of New York, have invented certain new and useful Improvements in Paint-Removers, of which the following is a specification.

This invention relates to finish removers comprising volatile organic solvents capable of dissolving metallic chlorids and a metallic chlorid dissolved therein.

It relates particularly to loosening finish solvents or alcoholic bodies, more or less saturated with salt, such as calcium or magnesium chlorid.

In the removal of finish by volatile organic solvents it is necessary to have present a body which will restrain evaporation, thereby permitting the solvent to complete its action upon the finish to be removed. For these purposes waxes are ordinarily employed:

My invention has to do with the saturation, more or less, of the solvents, with a soluble body, which reduces the vapor tension of the solvents so as to retard evaporation. A suitable composition consists of methyl acetone thickened to a paste with powdered calcium chlorid. To such paste various hydrocarbon solvents, or fillers, or wax may be added forming a mass which has paint removing properties. Suitable loosening finish solvents, that is, solvent material having a generally alcoholic character or action in removers may be used including various common alcohols, such as wood alcohol, denatured alcohol, amyl alcohol and the like, acetone and other ketones. Aldehydes, ether and esters may be used, the addition being made to an extent dependent upon the solubility of calcium chlorid therein; it being the object to carry in solution a sufficient amount of the soluble salt to restrain evaporation. Various fillers may be used such as flour, starch, whiting, saw-dust, casein and the like.

This invention has been described in connection with a number of illustrative ingredients, formulas, proportions, and processes, to the details of which disclosure the invention is not, of course, to be limited.

What is claimed is:—

1. A finish remover comprising methyl acetone, benzol, and incorporated calcium chlorid and wax, said remover being substantially non-aqueous.

2. A substantially fluent non-aqueous finish remover comprising volatile composite organic finish softening material including methyl acetone and carrying dissolved therein a considerable proportion of a chlorid of an alkaline earth restraining the evaporation of the volatile material.

3. A finish remover comprising methyl acetone, an aromatic finish solvent and incorporated calcium chlorid evaporation-retarding material, said remover being substantially non-aqueous.

4. A substantially non-aqueous finish remover comprising volatile composite organic finish softening material including methyl acetone carrying dissolved therein a considerable proportion of a chlorid of an alkaline earth restraining the evaporation of said volatile finish softening material.

5. A substantially fluent non-aqueous finish remover comprising volatile composite organic finish softening material including an aromatic finish solvent and loosening finish solvent material and incorporated dissolved calcium chlorid evaporation retarding material restraining the evaporation of said volatile finish solvent material.

6. A substantially fluent non-aqueous finish remover comprising volatile composite organic finish softening material including an aromatic finish solvent and loosening finish solvent material and a suitable proportion of an incorporated chlorid of an alkaline earth soluble in said loosening finish solvent material and restraining the evaporation of said volatile finish solvent material.

7. A substantially fluent non-aqueous finish remover consisting substantially of volatile composite organic finish softening material including loosening finish solvent material carrying dissolved therein a considerable proportion of calcium chlorid.

Signed at Larchmont, in the county of Westchester and State of New York this 14th day of September, A. D. 1907.

CARLETON ELLIS.

Witnesses:
THEODORE ELLIS,
BRIDELLA M. ELLIS.

Copies of this patent may be obtained for five cents each, by addressing the "Commissioner of Patents, Washington, D. C."